(12) United States Patent
Hsu et al.

(10) Patent No.: US 10,089,517 B2
(45) Date of Patent: Oct. 2, 2018

(54) FINGERPRINT IDENTIFYING MODULE

(71) Applicant: Primax Electronics Ltd., Taipei (TW)

(72) Inventors: Mao-Hsiu Hsu, Taipei (TW);
Kuan-Pao Ting, Taipei (TW)

(73) Assignee: PRIMAX ELECTRONICS LTD., Taipei (TW)

( * ) Notice: Subject to any disclaimer, the term of this patent is extended or adjusted under 35 U.S.C. 154(b) by 15 days.

(21) Appl. No.: 15/588,054

(22) Filed: May 5, 2017

(65) Prior Publication Data

US 2018/0173931 A1  Jun. 21, 2018

(30) Foreign Application Priority Data

Dec. 20, 2016 (CN) .......................... 2016 1 1186525

(51) Int. Cl.
*G06K 9/00* (2006.01)
(52) U.S. Cl.
CPC ............................. *G06K 9/00053* (2013.01)
(58) Field of Classification Search
CPC ................................................. G06K 9/00053
See application file for complete search history.

(56) References Cited

U.S. PATENT DOCUMENTS

| 2016/0335468 A1* | 11/2016 | Long | G06K 9/0053 |
| 2018/0015711 A1* | 1/2018 | Wu | G06K 9/00053 |
| 2018/0060645 A1* | 3/2018 | Zhang | G06K 9/40 |

FOREIGN PATENT DOCUMENTS

| CN | 104112142 | * | 10/2014 |
| CN | 104156713 | * | 11/2014 |
| CN | 105224926 | * | 1/2016 |
| CN | 107437059 | * | 4/2017 |

OTHER PUBLICATIONS

Tang et al., machine translation for CN104156713, Oct. 2014.*

* cited by examiner

*Primary Examiner* — Qiang Yang
(74) *Attorney, Agent, or Firm* — Muncy, Geissler, Olds & Lowe, P.C.

(57) ABSTRACT

The present invention relates to a fingerprint identifying module, including a fingerprint identifying and sensing element, a support board, and a metal ring. The support board may bear the fingerprint identifying and sensing element thereon, and includes an accommodation groove. The metal ring is sleeved on the fingerprint identifying and sensing element and the support board. Moreover, the metal ring includes a fixing column which is formed by extending a lower surface of the metal ring, so as to extend into the accommodation groove to fix the metal ring on the support board. The fingerprint identifying module of the present invention strengthens bonding between the metal ring and the support board by bonding the fixing column and the accommodation groove.

10 Claims, 5 Drawing Sheets

FINGERPRINT IDENTIFYING MODULE

FIELD OF THE INVENTION

The present invention relates to an identity identifying element, and particularly to a fingerprint identifying module identifying a user identity by using a fingerprint.

BACKGROUND OF THE INVENTION

In recent years, the fingerprint identifying technology is applied to various electronic products, so that a user may input an own fingerprint into an electronic product and make the electronic product save the fingerprint. Subsequently, the user may input the own fingerprint by using a fingerprint identifying module so as to unlock the electronic product. Unlocking the electronic product by using the fingerprint identifying technology is quicker and more convenient than previous unlocking manners by manually inputting a password, and therefore is liked by the user. Moreover, requirements for the fingerprint identifying module are also increased.

A structure of a conventional fingerprint identifying module is described below. Please refer to FIG. 1, and FIG. 1 is an exploded schematic diagram of a structure of a conventional fingerprint identifying module. A conventional fingerprint identifying module 1 includes a fingerprint identifying and sensing element 10, a cover body 11, a circuit board 12, a metal ring 13, and a support board 14. The fingerprint identifying and sensing element 10 is provided on the circuit board 12 and is electrically connected thereto so as to obtain electric power. A function of the fingerprint identifying and sensing element 10 is sensing a finger of the user to obtain fingerprint information thereof. The cover body 11 is provided at an upper surface of the fingerprint identifying and sensing element 10 by using a coating technology, and functions thereof may be, in addition to protecting the fingerprint identifying and sensing element 10, further providing a color consistent with the electronic product, or a required particular color. The metal ring 13 is sleeved on the fingerprint identifying and sensing element 10, so as to transfer electric charges on the finger of the user or external electric charges, thereby avoiding occurrence of the electrostatic discharge (Electrostatic Discharge, ESD) effect. The support board 14 bears the foregoing various components and contacts the circuit board 12, so as to strengthen structural strength of the circuit board 12, thereby avoiding the circuit board 12 being damaged by an external force.

During a process of assembling the conventional fingerprint identifying module 1, after the fingerprint identifying and sensing element 10, the cover body 11, the circuit board 12, and the support board 14 are stacked, the metal ring 13 needs to be sleeved on the fingerprint identifying and sensing element 10. Bonding between the metal ring 13 and the support board 14 is achieved by providing a liquid glue on the support board 14, so as to adhere the metal ring 13 and the support board 14. The liquid glue is easy to flow over from a gap between the metal ring 13 and the support board 14. Therefore, the overflowed liquid glue needs to be further cleared. In this way, time for manufacturing the fingerprint identifying module is prolonged. That is, a manufacturing efficiency of the fingerprint identifying module is reduced.

Therefore, a fingerprint identifying module which does not has a glue overflowing phenomenon is required.

SUMMARY OF THE INVENTION

An objective of the present invention is providing a fingerprint identifying module which does not has a glue overflowing phenomenon.

In a preferred embodiment, the present invention provides a fingerprint identifying module, including a fingerprint identifying and sensing element, a support board, and a metal ring. The fingerprint identifying and sensing element is configured to detect a fingerprint image of a finger. The support board is configured to bear the fingerprint identifying and sensing element thereon, and includes an accommodation groove. The metal ring is sleeved on the fingerprint identifying and sensing element and the support board, and is partially exposed outside the fingerprint identifying module, where the metal ring includes a fixing column which is formed by extending a lower surface of the metal ring extending, so as to extend into the accommodation groove to fix the metal ring on the support board.

Briefly, the fingerprint identifying module of the present invention enables, by providing the fixing column on the metal ring, and providing the corresponding accommodation groove on the support board, the fixing column to extend into the accommodation groove, so as to strengthen a bonding force at a horizontal direction between the metal ring and the support board. In another aspect, the accommodation groove on the support board may further accommodate a liquid glue therein. After the liquid glue is solidified, an extension plate located below the liquid glue may be fixed in the corresponding accommodation groove, thereby further improving a bonding force at a vertical direction between the metal ring and the support board. Therefore, it can be known that the fingerprint identifying module of the present invention may resolve the glue overflowing phenomenon, and may further strengthen the bonding between the metal ring and the support board.

DETAILED DESCRIPTION OF THE PREFERRED EMBODIMENT

Figure 1:
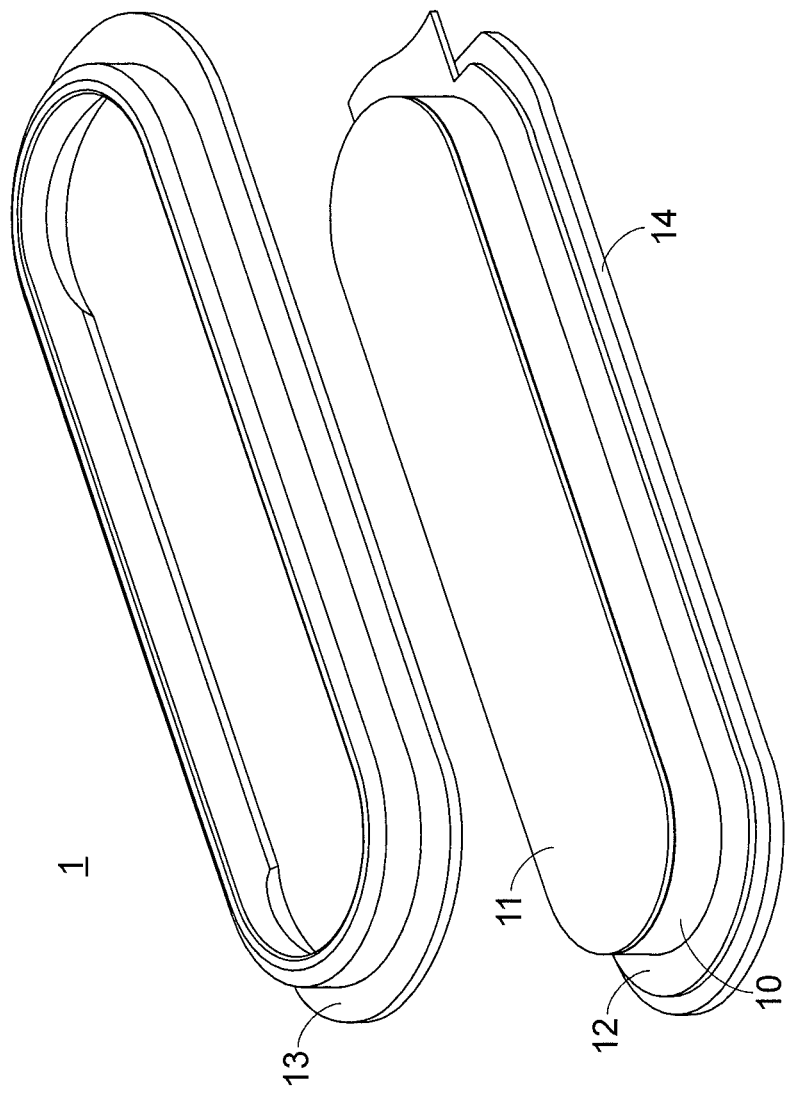
FIG. 1 is an exploded schematic diagram of a structure of a conventional fingerprint identifying module.
Figure 2:
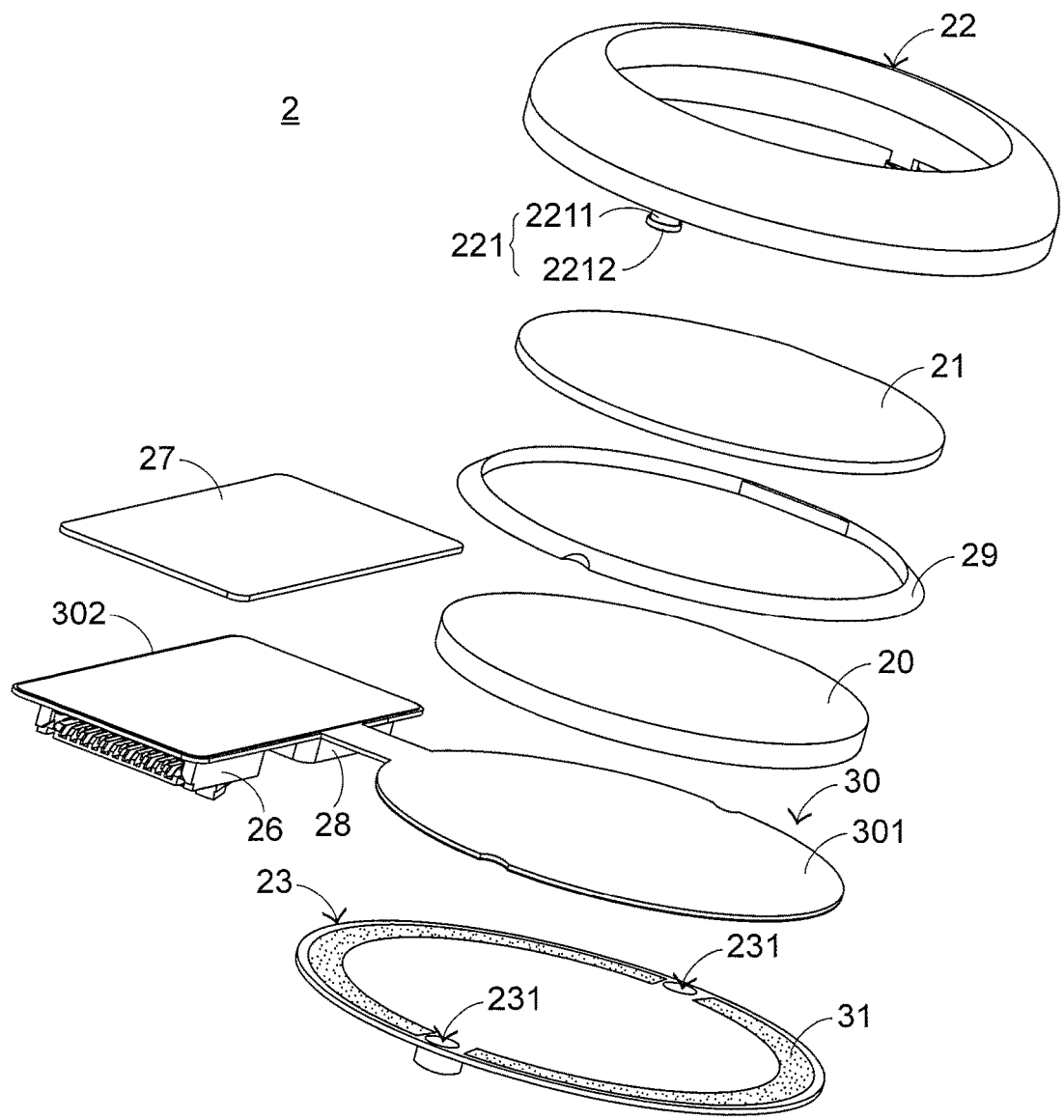
FIG. 2 is an exploded schematic diagram of a structure of a fingerprint identifying module of the present invention in a preferred embodiment.
Figure 3:
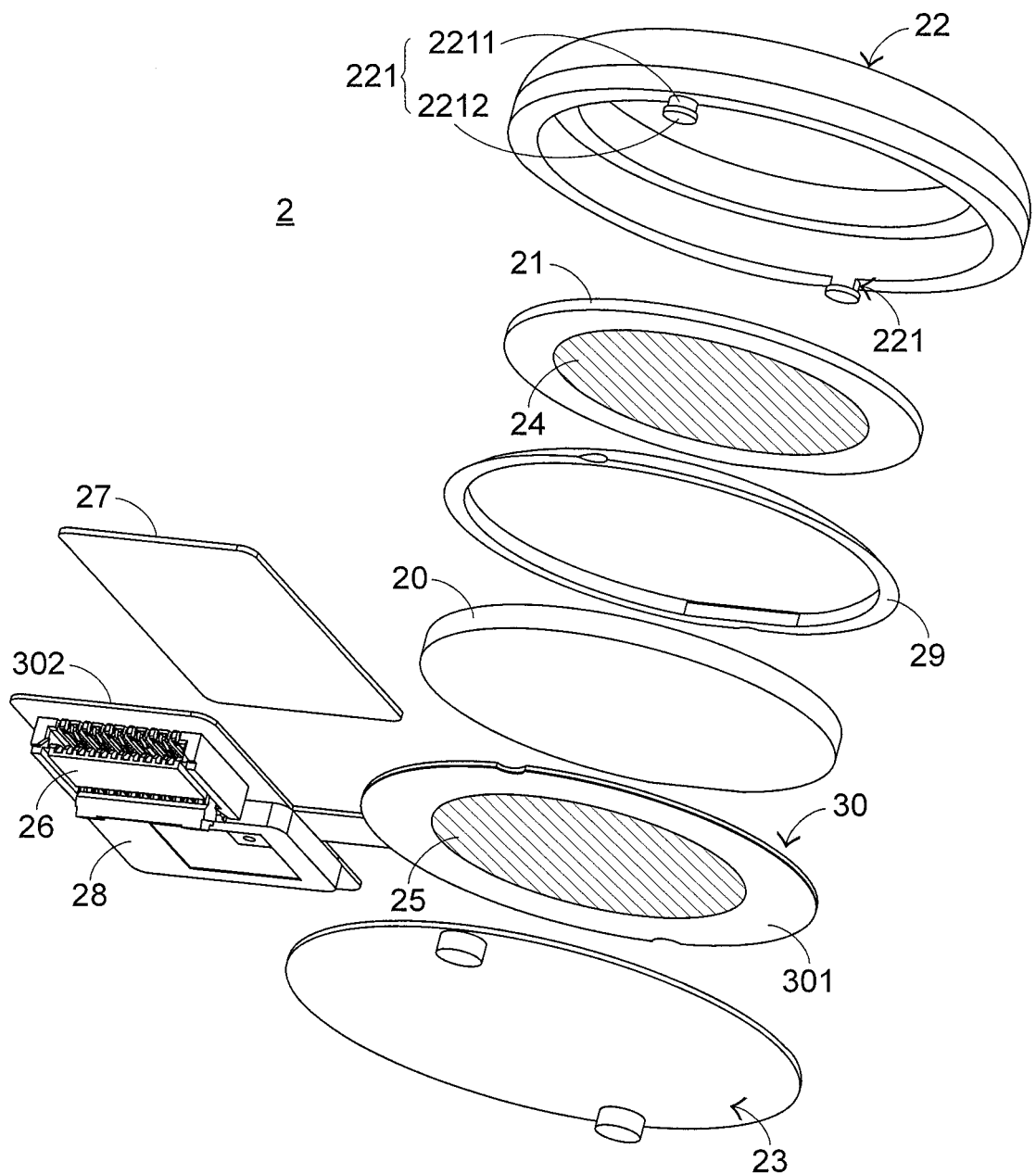
FIG. 3 is an exploded schematic diagram of a structure of a fingerprint identifying module of the present invention in a preferred embodiment from another angle of view.
Figure 4:
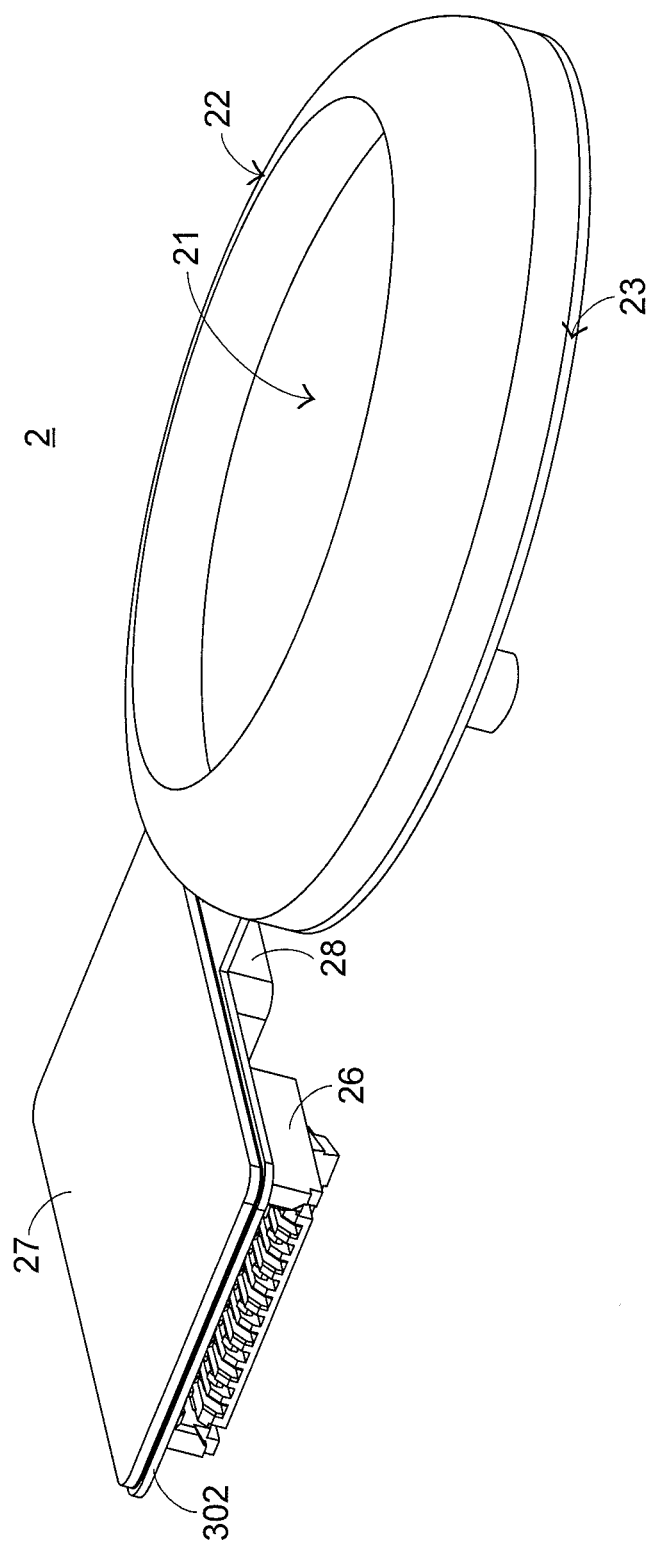
FIG. 4 is a schematic structural diagram of a fingerprint identifying module of the present invention in a preferred embodiment.

The present invention provides a fingerprint identifying module which may resolve conventional technical problems. Please refer to FIG. 2 to FIG. 4 at the same time. FIG. 2 is an exploded schematic diagram of a structure of a fingerprint identifying module in a preferred embodiment; FIG. 3 is an exploded schematic diagram of a structure of a fingerprint identifying module of the present invention in a preferred embodiment from another angle of view; and FIG. 4 is a schematic structural diagram of a fingerprint identifying module of the present invention in a preferred embodiment. FIG. 2 and FIG. 3 show various components of a fingerprint identifying module 2, including a fingerprint identifying and sensing element 20, a cover body 21, a metal ring 22, a first support board 23, a first adhesive layer 24, a second adhesive layer 25, a connector 26 (please refer to FIG. 4), a second support board 27, an electronic element 28, a sealing element 29, a circuit board 30, and a liquid glue 31. A function of the fingerprint identifying and sensing element 20 is detecting a fingerprint image of a finger of a user (not shown in the figures). The cover body 21 is provided on an upper surface of the fingerprint identifying and sensing element 20, and may protect the fingerprint identifying and sensing element 20. The circuit board 30 is located between the fingerprint identifying and sensing element 20 and the first support board 23, and is not only bonded with the fingerprint identifying and sensing element 20 but is also electrically connected thereto. The fingerprint identifying and sensing element 20 is bonded with the circuit board 30 by using a Surface Mount Technology (SMT). In this preferred embodiment, the fingerprint identifying and sensing element 20 is packed in a manner of land grid array (Land Grid Array, LGA) or ball grid array (Ball Grid Array, BGA); and the circuit board 30 may be selected as a flexible circuit board (FPC) or a rigid-flex board.

The first support board 23 is located below the circuit board 30, and may bear the fingerprint identifying and sensing element 20, the cover body 21, the metal ring 22, and the circuit board 30 thereon. The first support board 23 includes a plurality of accommodation grooves 231. The metal ring 22 is sleeved on the cover body 21, the fingerprint identifying and sensing element 20, and the first support board 23, and is partially exposed outside the fingerprint identifying module 2. The metal ring 22 includes a plurality of fixing columns 221, and each fixing column 221 corresponds to an accommodation groove 231. The fixing column 221 is formed by extending a lower surface of the metal ring 22, and may extend into the corresponding accommodation groove 231, so as to fix the metal ring 22 on the first support board 23.

In FIG. 2 and FIG. 3, the fixing column 221 includes a column body 2211 and an extension plate 2212, where the column body 2211 is formed by extending downwards the lower surface of the metal ring 22, so as to extend into the corresponding accommodation groove 231. The extension plate 2212 is formed by horizontally extending a bottom portion of the column body 2211, and may contact an inner side wall 2311 of the accommodation groove 231 when the column body 2211 extends into the accommodation groove 231. In this preferred embodiment, the column body 2211 and the extension plate 2212 are integrally formed with the fixing column 221.

The circuit board 30 includes a first board body 301 and a second board body 302, where the second board body 302 is formed by extending the first board body 301. The first board body 301 is electrically connected to the fingerprint identifying and sensing element 201, and contacts the first support board 23. The first support board 23 is located below the first board body 301 of the circuit board 30 and is connected to the first board body 301, and may bear the first board body 301 thereon and strengthen a structure of the first board body 301. The first adhesive layer 24 is provided on a lower surface of the cover body 21 or an upper surface of the fingerprint identifying and sensing element 20, and may bond the cover body 21 and the fingerprint identifying and sensing element 20. The second adhesive layer 25 is provided on a lower surface of the first board body 301 or an upper surface of the first support board 23, and may bond the first board body 301 and the first support board 23. In this preferred embodiment, the first adhesive layer 24 is a non-liquid double-sided tape, and the second adhesive layer 25 is an adhesive.

It should be particularly noted that, first, according to the present invention, the circuit board 30 is designed to have a two-piece shape, but is integrally formed, and internal lines are electrically connected to each other. The two-piece shape is merely for aesthetic purposes. Certainly, the circuit board may also uses a one-piece shape which integrates the first board body and the second board body as an integral. Second, the second adhesive layer may also use a conductive adhesive according to the actual requirements, so as to improve electrical conduction of the circuit board 30 and the first support board 23.

Figure 5:
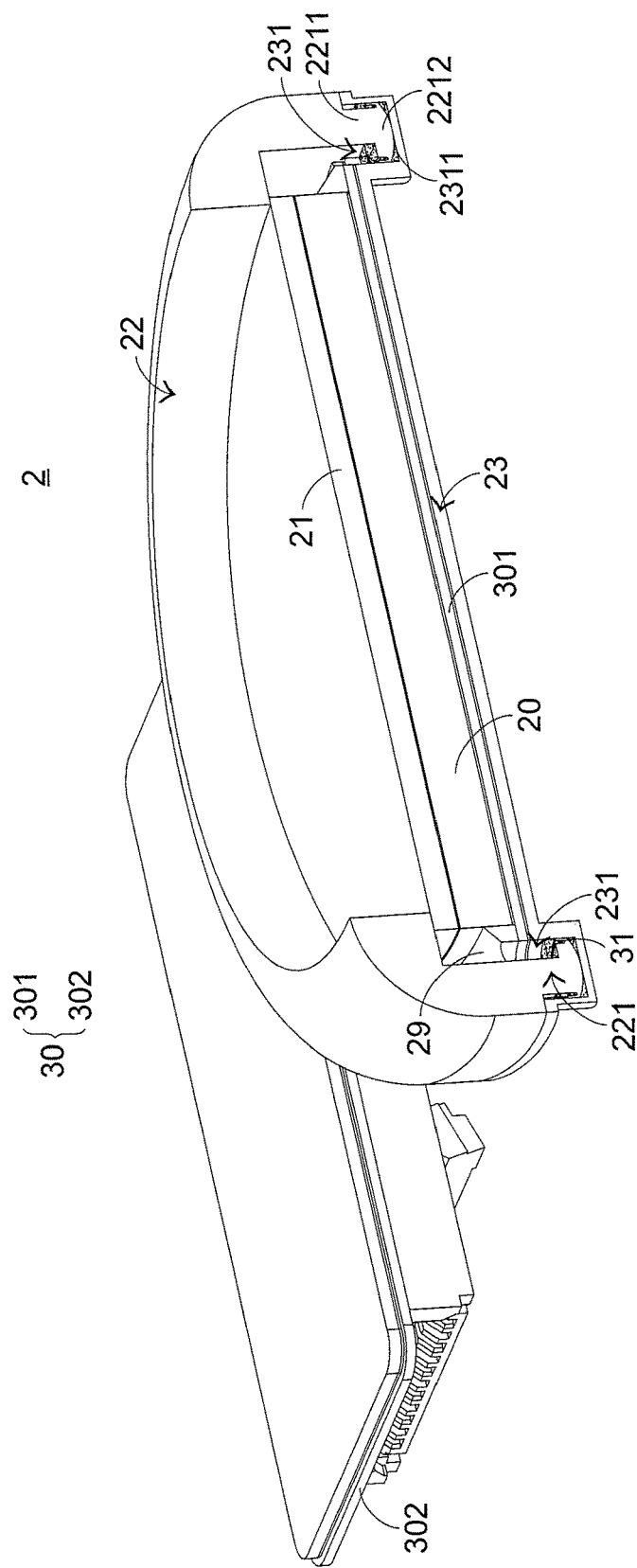
FIG. 5 is a sectional schematic diagram of a structure of a fingerprint identifying module of the present invention in a preferred embodiment.

The connector 26 is provided on a first surface of the second board body 302, and a function thereof is electrically connecting the second board body 302 and an external electronic element (not shown in the figures). The external electronic element is, for example, a connection portion of an electronic product which accommodates the fingerprint identifying module 2, so as to establish an electric connection between the fingerprint identifying module 2 and the electronic product. The second support board 27 is provided on a second surface of the second board body 30, that is, provided at a back surface of the connector 26. The second support board 27 may strengthen a structure of the second board body 302, so as to firm a configuration of the connector 26. A plurality of electronic elements 28 are provided on the second board body 302, and may generate a particular function. The sealing element 29 is provided on the first board body 301 of the circuit board 30, and surrounds the fingerprint identifying and sensing element 201, as shown in FIG. 5. A function of the sealing element 29 is avoiding a foreign object (for example, an external liquid or external dusts) entering between the fingerprint identifying and sensing element 201 and the circuit board 30. In this preferred embodiment, the plurality of electronic elements 28 may be capacitors, diodes, or processors, and the sealing element 29 is a sealant.

Please refer to FIG. 2 to FIG. 5 at the same time. During a process of bonding the metal ring 22 and the first support board 23, the liquid glue 31 needs to be first provided on an annular region 232 of the first support board 23, where the annular region 232 is defined as a peripheral region of a position at which the first board body 301 is located. After the liquid glue 31 is provided, the metal ring 22 and the first support board 23 are bonded, so that the plurality of fixing columns 221 extend into the corresponding accommodation grooves 231, respectively. At this time, a plurality of extension plates 2212 contact the inner side walls 2311 of the accommodation grooves 231. According to a structure that the plurality of fixing columns 221 respectively extend into the plurality of accommodation grooves 231, a horizontal bonding force is strengthened. Therefore, when the fingerprint identifying module 2 is applied by a horizontal external force, it is difficult for the metal ring 22 to be separated from the first support board 23. Hereto, initial bonding of the metal ring 22 and the first support board 23 is completed.

In another aspect, the metal ring 22 is sleeved on the cover body 21 and the fingerprint identifying and sensing element 20. Subsequently, when the metal ring 22 is sleeved on the cover body 21, the fingerprint identifying and sensing element 20, and the first support board 23, the liquid glue 31 located on the annular region 232 is pushed against by the metal ring 22, so as to flow toward the plurality of accommodation grooves 231, and cover the plurality of extension plates 2212. The liquid glue 31 covers the plurality of extension plates 2212 within the plurality of accommodation grooves 23. Therefore, after the liquid glue 31 is solidified, the plurality of extension plates 2212 may further be enabled to be fixed in the corresponding accommodation grooves 23. In this way, a bonding force between the metal ring 22 and the first support board 23 may further be improved. The fingerprint identifying module 2 is formed by combining various components, and combination states are shown in FIG. 4 and FIG. 5.

It should be particularly noted that in this preferred embodiment, the cover body 21 is made of a glass material; this is merely for illustration purposes, but does not form a limitation. In another preferred embodiment, the cover body may also be made of a ceramic material. In a preferred practice, the cover body further includes an anti-fingerprint layer and a color layer. The anti-fingerprint layer is provided on an upper surface of the cover body, and may prevent a fingerprint pattern of the finger from being adhered to the cover body, so as to keep clean. In another aspect, it is not easy for the fingerprint pattern to remain on the anti-fingerprint layer. Therefore, the fingerprint identifying and sensing element may correctly detect the fingerprint image of the finger, without being affected by the residual fingerprint pattern. The color layer is provided at a lower surface of the cover body, so that the cover body may display a required color, thereby achieving aesthetic effects.

It can be known from the above that the fingerprint identifying module of the present invention enables, by providing the fixing column on the metal ring, and providing the corresponding accommodation groove on the support board, the fixing column to extend into the accommodation groove, so as to strengthen a bonding force at a horizontal direction between the metal ring and the support board. In another aspect, the accommodation groove on the support board may further accommodate the liquid glue therein. After the liquid glue is solidified, the extension plate located below the liquid glue may be fixed in the corresponding accommodation groove, thereby further improving a bonding force at a vertical direction between the metal ring and the support board. Therefore, it can be known that the fingerprint identifying module of the present invention may resolve the glue overflowing phenomenon, and may further strengthen the bonding between the metal ring and the support board.

The foregoing is merely the preferred embodiments of the present invention, and is not intended to limit the scope of the present invention. Therefore, any other equivalent replacement or modification made without departing from the spirit disclosed by the present invention shall fall within the scope of the present invention.

What is claimed is:

1. A fingerprint identifying module, comprising:
   a fingerprint identifying and sensing element, configured to detect a fingerprint image of a finger;
   a support board, configured to bear the fingerprint identifying and sensing element thereon, wherein the support board comprises an accommodation groove; and
   a metal ring, sleeved on the fingerprint identifying and sensing element and the support board, and partially exposed outside the fingerprint identifying module, wherein the metal ring comprises a fixing column which is formed by extending a lower surface of the metal ring, so as to extend into the accommodation groove to fix the metal ring on the support board.

2. The fingerprint identifying module according to claim 1, wherein the fixing column comprises:
   a column body, formed by extending the lower surface of the metal ring, so as to extend into the accommodation groove; and
   an extension plate, formed by extending a bottom portion of the column body, and configured to contact an inner side wall of the accommodation groove when the column body extends into the accommodation groove.

3. The fingerprint identifying module according to claim 1, further comprising a liquid glue which is provided on an annular region of the support board, wherein when the metal ring is sleeved on the fingerprint identifying and sensing element and the support board, the liquid glue is pushed against by the metal ring, so as to flow toward the accommodation groove, and cover the extension plate.

4. The fingerprint identifying module according to claim 1, further comprising:
   a cover body, provided on an upper surface of the fingerprint identifying and sensing element, and configured to protect the fingerprint identifying and sensing element; and
   a circuit board, located between the fingerprint identifying and sensing element and the support board, and electrically connected to the fingerprint identifying and sensing element.

5. The fingerprint identifying module according to claim 4, further comprising a sealing element which is provided on the circuit board and surrounds the fingerprint identifying and sensing element, and is configured to avoid a foreign object entering between the fingerprint identifying and sensing element and the circuit board.

6. The fingerprint identifying module according to claim 4, further comprising a first adhesive layer which is provided on the cover body or the fingerprint identifying and sensing element, and is configured to bond the cover body and the fingerprint identifying and sensing element.

7. The fingerprint identifying module according to claim 4, wherein the circuit board comprises:
   a first board body, electrically connected to the fingerprint identifying and sensing element, and contacting a first support board; and
   a second board body, formed by extending the first board body.

8. The fingerprint identifying module according to claim 7, further comprising a second adhesive layer which is provided on the first board body or the support board, and is configured to bond the circuit board and the support board.

9. The fingerprint identifying module according to claim 8, wherein the second adhesive layer is an adhesive or a conductive adhesive.

10. The fingerprint identifying module according to claim 7, further comprising:
    a connector, provided on a first surface of the second board body, and configured to electrically connect the second board body and an external electronic element;
    another support board, provided on a second surface of the second board body, and configured to strengthen a structure of the second board body; and
    an electronic element, provided on the first surface of the second board body.

* * * * *